United States Patent [19]
Strunk

[11] Patent Number: 6,108,348
[45] Date of Patent: Aug. 22, 2000

[54] 2.4-TO-3 KBPS RATE ADAPTATION APPARATUS FOR USE IN NARROWBAND DATA AND FACSIMILE COMMUNICATIONS SYSTEMS

[75] Inventor: R. William Strunk, Line Lexington, Pa.

[73] Assignee: Lockheed Martin Corporation, King of Prussia, Pa.

[21] Appl. No.: 08/991,605

[22] Filed: Dec. 16, 1997

Related U.S. Application Data

[60] Provisional application No. 60/058,672, Sep. 12, 1997.

[51] Int. Cl.[7] ....................................................... H04J 3/16
[52] U.S. Cl. ............................ 370/465; 370/235; 370/545
[58] Field of Search ..................................... 370/235, 465, 370/466, 470, 471, 472, 474, 476, 481, 545

[56] References Cited

U.S. PATENT DOCUMENTS

| | | |
|---|---|---|
| 4,979,169 | 12/1990 | Almond et al. ........................... 370/466 |
| 5,335,225 | 8/1994 | Brax .......................................... 370/465 |
| 5,502,752 | 3/1996 | Averbuch et al. ....................... 370/465 |
| 5,920,545 | 7/1999 | Räsänen et al. ......................... 370/235 |

*Primary Examiner*—Douglas W. Olms
*Assistant Examiner*—Shick Hom
*Attorney, Agent, or Firm*—W. H. Meise

[57] ABSTRACT

Data at 2.4 kbps is to be transmitted over a noisy link having 3 kbps capacity, and made available to ISDN-compatible user devices. The 2.4 kbps data is multiplexed with its control and synchronization signals in a first rate adapter to generate 3 kbps data, organized into 10 msec frames of 30 bits, and transmitted over the link. The signals received from the link are further adapted in a second rate adapter to form 8 kbps, 10 msec, 80-bit, V.110 frames. Not all of the data for each 10 msec, 80-bit frame is available from the corresponding 10 msec, 30-bit frame. Some of the additional data is multiplexed onto plural 30-bit frames, and becomes available to the current 80-bit frame by use of a memory. Other bits of the additional data is stored in a memory in the second rate adapter, and used to fill in the 80-bit frames. The 8 kbps data is further rate adapted to 64 kbps by addition of dummy bits.

7 Claims, 5 Drawing Sheets

Fig. 1

| D1 | D2 | D3 | S1 | D4 | D5 | D6 | X |
|----|----|----|----|----|----|----|----|
| D7 | D8 | D9 | S3 | D10 | D11 | D12 | S4 |
| E4 | E5 | E6 | E7 | D13 | D14 | D15 | S6 |
| D16 | D17 | D18 | X | D19 | D20 | D21 | S8 |
| D22 | D23 | D24 | S9 | | | | |

*Fig. 2*
PRIOR ART

| o | o | o | o | o | o | o | o |
|---|---|---|---|---|---|---|---|
| — | D1 | D1 | D2 | D2 | D3 | D3 | 0 |
| — | D4 | D4 | D5 | D5 | D6 | D6 | S1 |
| — | D7 | D7 | D8 | D8 | D9 | D9 | x |
| — | D10 | D10 | D11 | D11 | D12 | D12 | S3 |
| — | E1 | E2 | E3 | E4 | E5 | E6 | S4 |
| — | D13 | D13 | D14 | D14 | D15 | D15 | E7 |
| — | D16 | D16 | D17 | D17 | D18 | D18 | S6 |
| — | D19 | D19 | D20 | D20 | D21 | D21 | x |
| — | D22 | D22 | D23 | D23 | D24 | D24 | S8 |
|   |     |     |     |     |     |     | S9 |

| D1 | D2 | D3 | S1 | S3 | D5 | D6 | X | E7·0 | D8 |
|----|----|----|----|----|----|----|---|------|----|
| D9 | D10 | D11 | D12 | D4 | D13 | D14 | D15 | D7 | D16 |
| D17 | D18 | S6 | D19 | D20 | D21 | D22 | D23 | D24 | S8 |

Fig.5b

| D1 | D2 | D3 | S1 | S4 | D5 | D6 | X | E7·1 | D8 |
|----|----|----|----|----|----|----|---|------|----|
| D9 | D10 | D11 | D12 | D4 | D13 | D14 | D15 | D7 | D16 |
| D17 | D18 | S6 | D19 | D20 | D21 | D22 | D23 | D24 | S9 |

US 6,108,348

2.4-TO-3 KBPS RATE ADAPTATION APPARATUS FOR USE IN NARROWBAND DATA AND FACSIMILE COMMUNICATIONS SYSTEMS

This patent application claims priority of provisional patent application Ser. No. 60/058,672 filed Sep. 12, 1997.

FIELD OF THE INVENTION

This invention relates to digital communications systems for interfacing between data sources and transmission paths having disparate data rates, and more particularly to interfacing between 2.4 kbps and 3.0 kbps data rates in such systems.

BACKGROUND OF THE INVENTION

In communications context, facsimile machines and some computerized data sources operate at data rates of 2.4 k bps for the data, and may have associated control information. Such information must be transmitted to the desired destination for use.

Figure 1:
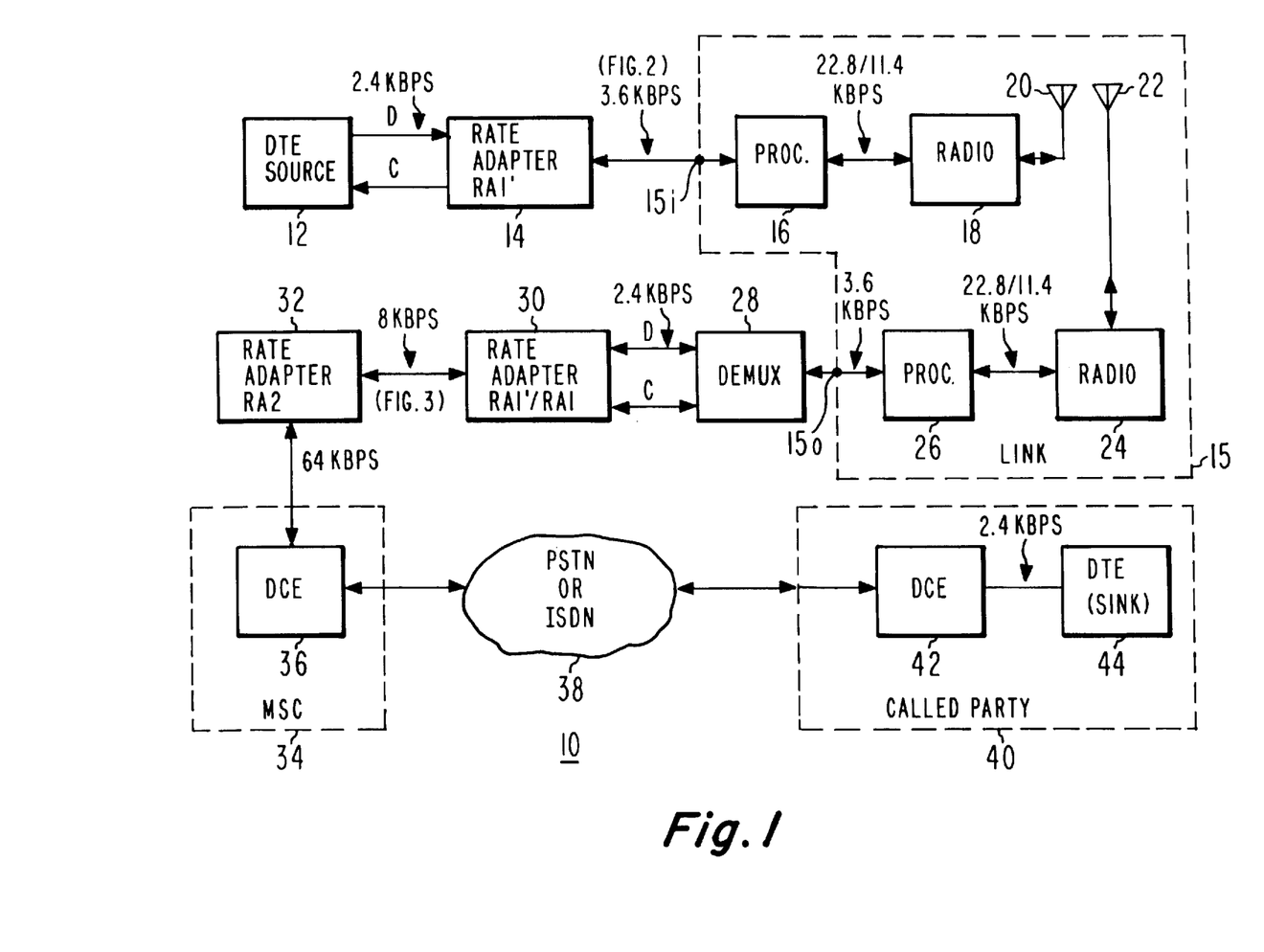
FIG. 1 is a simplified block diagram of a communication system which uses, in part, a prior-art GSM cellular air link, and, in part, a prior-art ISDN-compatible network, in its transmission path.

The data path may have an error-prone characteristic, so error detection and correction bits must be added. The data path is also bandwidth-limited. FIG. 1 is a simplified block diagram illustrating a communication system 10 for communicating data/fascimile signals between a control-plus-2.4 kbps data "digital terminal equipment" (DTE) source 12 and a called party 40. Communication system 10 of FIG. 1 includes a data path extending between antennas 20 and 22 which is part of a prior-art GSM cellular communication system, which uses existing standards for a GSM cellular communication system, as described in more detail below.

The GSM system is described in detail in the text *The GSM System for Mobile Communications*, subtitled *A Comprehensive Overview of the European Digital Cellular System*, authored by Michel Mouly and Marie-Bernadette Pautet, and published in 1992 by the authors, at 4, rue Elisée Reclus, F-91120 Palaiseau, France. Another text that describes the GSM system is *Mobile Radio Communications*, by Raymond Steele, published by Pentech Press, London, ISBN 0-7273-1406-8.

Figure 2:
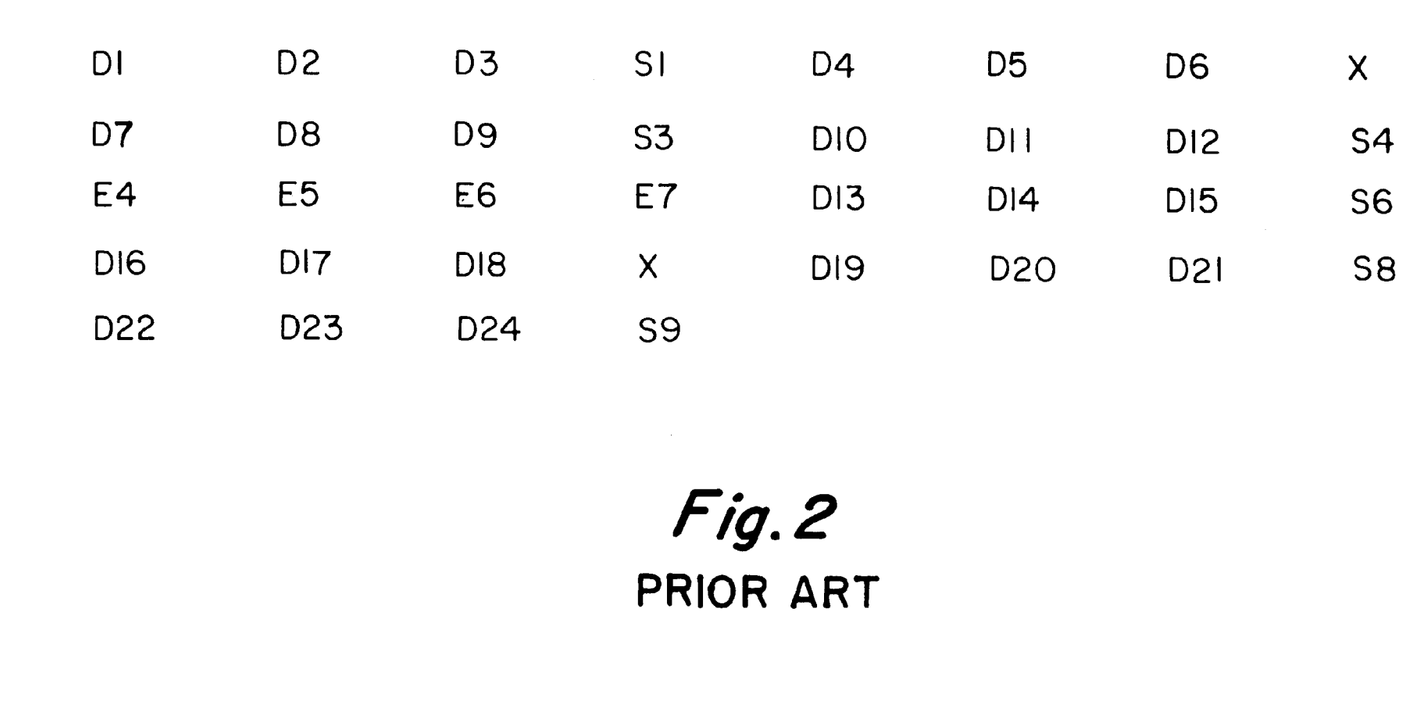
FIG. 2 is an illustration of the bit structure of a 10 msec., 36-bit frame such as that used by GSM.

In FIG. 1, source 12 transmits or sends data at 2.4 kbps on a data (D) line or path to a rate adapter 14, which converts the data to 3.6 kbps. In the GSM system, rate adapter 14 is known as RA1'. Source 12 also sends asynchronous control information over a C path to rate adapter 14. Rate adapter 14 multiplexes the signals from the D and C paths, and adds auxiliary information bits known as "E4, E5, and E6" bits, which represent information relating to the network independent clocking. In simple terms, network independent clocking involves clocking information to take into account differences between the data rate of source 12 and the remainder of the system of FIG. 1. The multiplexing of the auxiliary information bits with the control bits and the 2.4 kbps data bits in rate adapter 14 brings the output bit rate to 3.6 kbps, organized into successive 36-bit, 10 millisecond (msec.) frames. FIG. 2 illustrates the data bit organization of a typical 10 msec. frame. In effect, rate adapter 14 maps the information, including data and control bits, from the 2.4 kbps data rate to the 36-bit, 10 msec frame of FIG. 2.

In the data organization illustrated in the frame of FIG. 2, there are 24 bits designated "D", which are data bits. More particularly, there are 24 D data bits, denominated D1, D2, D3, D4, D5, D6, D7, D8, D9, D10, D11, D12, D13, D14, D15, D16, D17, D18, D19, D20, D21, D22, D23, and D24. In addition to the D bits, the frame of FIG. 2 includes two bits designated X, five status bits designated S1, S3, S4, S6, and S9, and four auxiliary bits designated E4, E5, E6, and E7, for a total of 36 bits. In the 10 msec., 36-bit frame of FIG. 2, time proceeds from left to right, top to bottom, so the first-occurring bit is that one designated Di, and the second bit is D2. The last bit in the 10 msec. frame is S8. In the frame of FIG. 2, a rudimentary form of error protection is available in the form of duplication of the X bit.

The 3.6 kbps data stream represented by successive 10 msec., 36-bit frames, such as that shown in FIG. 2, is further processed in processing (PROC) block 16 of FIG. 1 by addition of error detection and correction (EDAC) codes, for transmission by a radio 18 and associated antenna 20 over an air link of the GSM system. The signal leaving processor 16 has a data rate of 11.4 kbps for a transmission over a half-rate-channel, or 22.8 kbps for a full-rate GSM channel. Those skilled in the art know that radio 18 performs modulation and upconversion as needed. At the receiving end of the air link, antenna 22 receives the signal, and routes it to a radio 24, where it is downconverted and demodulated, as may be required to regenerate the 11.4/22.8 kbps data. A processor 26 performs error correction and detection, as by use of Viterbi decoding, and produces what is expected to be error-free data at 3.6 kbps, a replica of, or equivalent to the data at the output of block 14, representing the multiplexed data, synchronization, and control. The 3.6 kbps data and control signals from block 26 ae applied to a demultiplexer 28, where the signals are demultiplexed to control (and any synchronization signals which accompany the control), together with 2.4 kbps data. The data stream, demultiplexed by block 28 into data, control, and auxiliary information portions, is transmitted to a second rate adapter 30 by way of a D data path, and the control and auxiliary information are transmitted by way of a C path.

Figure 3:
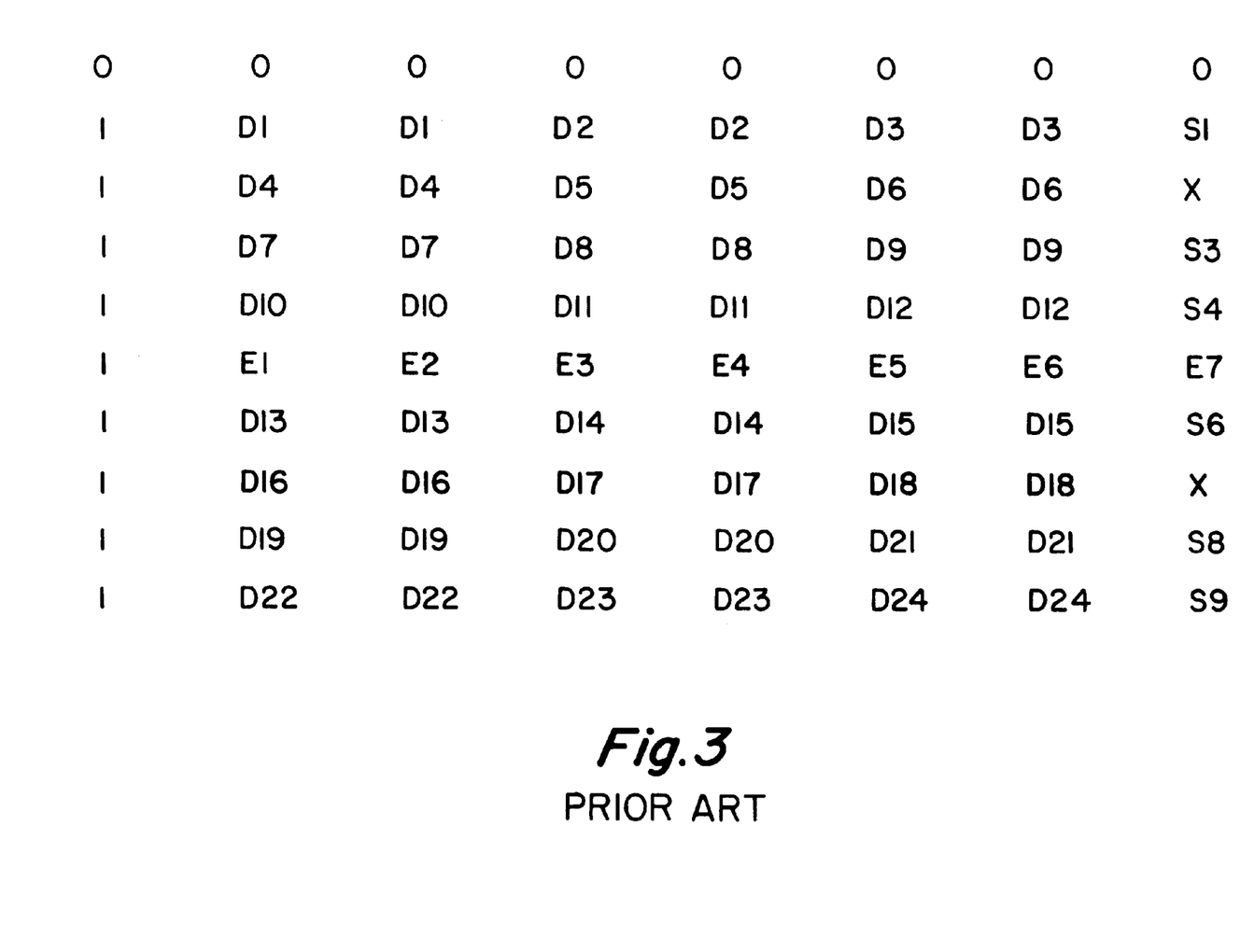
FIG. 3 is an illustration of the bit structure of a 10 msec., 80-bit ITU V.110 frame, which is compatible with ISDN.

The 2.4 kbps data and the control signals from demultiplexer 28 of FIG. 1 are applied to a second rate adapter 30, which is designated RA1'/RA1 in the GSM system. Second rate adapter 30 maps the 2.4 kbps data and its accompanying control signals into an 8 kbps data stream organized into 10 msec., 80-bit, V.110 frames, as defined by the Consultative Committee for International Telephone and Telegraph (CCITT), now the International Telecommunications Union (ITU). FIG. 3 illustrates the data organization of V.110 ITU frames.

In the ITU V.110 10 msec., 80-bit frame of FIG. 3, time proceeds from left to right, top to bottom, as in the case of FIG. 2, so the first eight (synchronizing) bits of the frame are binary 0, and the 9th, 17th, 25th, 33d, 41st, 49th, 57th, 65th, and 73d (synchronizing) bits are binary 1. In order to form the frame of FIG. 3 from the 2.4 kbps data stream emerging from demultiplexer 28 of FIG. 1, the synchronizing binary 0 bits are first inserted in bit positions 1 to 8, and the binary 1 bits are inserted into the abovementioned 9th, 17th, 25th, 33d, 41st, 49th, 57th, 65th, and 73d positions. As in the case of FIG. 2, the bits of FIG. 3 designated D represent data bits, identified by a suffix ranging from 1 to 24, relating to the individual ones of the 24 data bits. As can be seen in FIG. 2, all of the data bits D are duplicated. Since both the 36-bit frame of GSM and the 80-bit V.110 frame have a duration of 10 msec., they are associated on a one-to-one basis, although there may be a time difference between their occurrence. That is, the information from a "current" 36-bit frame is available to populate the 80-bit frame, by, for example, for each data (D) bit, inserting bit value in the two appropriate locations in the V.110 frame. Note that the E1, E2, and E3 bits of the V.110 frame do not appear in the 36-bit frame. The values of E1, E2, and E3 represent the source data rate, which is available during set-up of a GSM call, but does not appear in each 36-bit frame. Thus, the values of E1, E2, and E3 can be stored in rate adapter 30 of FIG. 1 at the time the call is initiated, and saved for insertion into each later frame.

The 8 kbps data flow represented by the successive V.110 frames outputted from second rate adapter block 30 of FIG. 1, and as represented by FIG. 3, is further increased in data rate in a third rate adapter block 32 to 64 kbps, by filling with binary ones, for use by ISDN-compatible devices. This third rate adapter is known as RA2 in GSM and in ISDN literature. From third rate adapter 32, the 64 kbps data is applied to data circuit equipment (DCE) 36, which is a part of mobile switching center (MSC) 34, which is IDSN-compatible. MSC 34 in turn connects to a public switched telephone network (PSTN).

MSC 34 of FIG. 1 contains other DCEs 36 for carrying other calls, and also performs other switching functions. DCE 36 is a modem for interfacing with a network 38, which may be, for example, a public switched telephone network (PSTN), an ISDN network, or a private network. The data applied to DCE 36 is modulated in a manner suited for transmission over network 38, and is routed over network 38 to the called party 40. At the called party 40, a modem or DCE 42, corresponding to or interfacing with DCE 36, converts the modulated signal into 2.4 kbps data and control signals.

A block 44 represents a data sink or facsimile machine for using the data originating from DTE 12. Of course, while the arrangement of FIG. 1 has been described as transmitting information from DTE 12 to DTE 44, transmission may be accomplished in both directions over the same channel.

Figure 4:
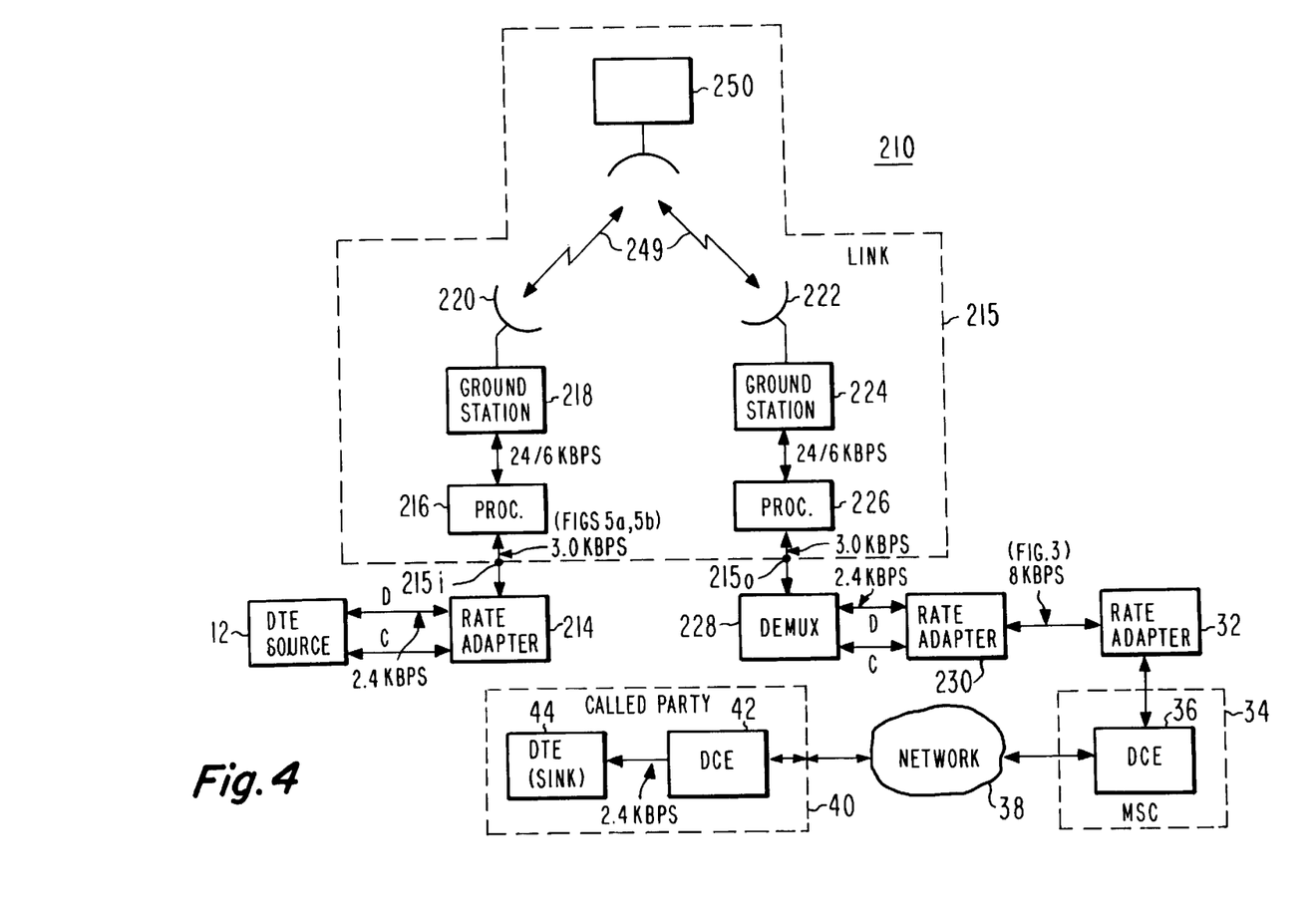
FIG. 4 is a simplified block diagram of a communication system according to an aspect of the invention, in which the source data rate is 2.4 kbps and the link data capacity is 3 kbps.

In a spacecraft or satellite communication system, it may be desirable to use GSM standards for compatibility, to the extent possible. Thus, signals at 2.4 kbps from DTE 12 of FIG. 1 must be processed for transmission over satellite air links, rather than for terrestrial air links. Ideally, the same processing would be used as in GSM. However, the satellite communication link differs from the GSM terrestrial air link in a number of ways, particularly in the values of transmitted power and bandwidth. The rates at which data is transmitted over the satellite communication links therefore differ from those of GSM. FIG. 4 illustrates, inter alia, a satellite communications system known as ACeS.

A full-rate channel of the ACeS satellite communication system, for example, is expected to have a data rate of 24 kbps; this corresponds to the 22.8 kbps rate at the output tof block 16 of FIG. 1. While this 24 kbps is greater than the 22.8 kbps of the GSM full-rate channel, most of the ACeS services are offered on a quarter-rate channel (6 kbps), while most GSM services are offered on a full-rate channel (22.8 kbps). Thus, a 2.4 kbps data call or link, such as that described in conjunction with FIG. 1, would, in a satellite context, require a 3.6-to-6 kbps rate conversion for error correction, rather than a 3.6-to-22.8 kbps rate conversion. In general, the link margin is less on the satellite system than on the GSM terrestrial systems. The margin for error correction is only 6/3.6 in the satellite context, by comparison with the 22.8/3.6 margin in GSM. This lesser margin is considered to be insufficient for commercial use.

Consequently, some other method must be used for rate adaptation.

SUMMARY OF THE INVENTION

A digital communication system, for communicating with an ISDN-compatible system having a bit rate of 64 kbps over a communication link having a data rate of 3 kbps, includes a source of synchronous information data at a data rate of 2.4 kbps, and associated control bits. The digital communication system also includes a first rate adaptation arrangement coupled to the source of information data and to an input port of the link . The first rate adaptation arrangement converts the data rate of 2.4 kbps to a data rate of 3 kbps. The 3 kbps data is organized into successive 10 msec frames, each of 30 bits, as illustrated in FIG. 5. Each of the 10 msec, 30-bit frames includes a single X status bit, and an E7 bit which alternates binary states from one frame to the next. Each of the 10 msec, 30-bit frames also includes S3 and S8 status bits, but not S4 and S9 status bits, during those frames in which the E7 bit takes a first binary state. Each of the 10 msec, 30-bit frames further includes S4 and S9 status bits, but not S3 and S8 status bits, during those frames in which the E7 bit takes a second binary state. Consequently, information relating to the S3 and S4 bits is multiplexed onto alternate ones of the 10 msec frames, and information relating to the S8 and S9 bits is multiplexed onto alternate other ones of the 10 msec frames. The first rate adaptation arrangement transmits the 3 kbps data over the link. A second rate adaptation arrangement is coupled to an output port of the link, for converting the 3 kbps data received from the link to 8 kbps. The communication system further includes a third rate adaptation arrangement coupled to the second rate adaptation arrangement, for converting the 8 kbps data to 64 kbps, ISDN-compatible data. The first binary state of the E7 bit may be binary 0, and the second binary state in that case is binary 1.

In a particular embodiment of the invention, each the 10 msec, 30-bit frames further includes S1 and S6 bits, and 24 data bits denominated D1, D2, D3, D4, D5, DG, D7, D8, D9, D10, D11, D12, D13, D14, D15, D16, D17, D18, D19, D20, D21, D22, D23, and D24. The sequence in which the 30 bits occur in the 10 msec, 30-bit frame is D1, D2, D3, S1, D4, D5, D6, X, D7, D8, D9, D10, D11, D12, one of S3 and S4, D13, D14, D15, E7, D16, D17, D18, S6, D19, D20, D21, D22, D23, D24, and one of S8 and S9.

In this particular embodiment, the second rate adaptation arrangement includes a memory preloaded with information specifying the values of E1, E2, and E3 bits. The second rate adaptation arrangement, which is coupled to the output port of the link, maps information from at least each pair of the 10 msec 30-bit frames to a 10 msec 80-bit frame, in accordance with the V.110 standard of the International Telecommunications Union (ITU). The 10 msec, 80-bit frame has the first eight bits set to a first binary state, and also has the 9th, 17th, 25th, 33d, 41st, 49th, 57th, 65th, 73d bits set to a second binary state. The other 73 bits of the 10 msec, 80-bit frame are available for carrying information. The mapping from the 30-bit frames to the 80-bit frames is accomplished by setting, in each of the 80-bit V.110 frames, the D1, D2, D3, D4, D5, D6, D7, D8, D9, D10, D11, D12, D13, D14, D15, D16, D17, D18, D19, D20, D21, D22, D23, D24 data bits, and the X and E7 bits, in accordance with the corresponding value in the current one of the 10 msec, 30-bit frames, and by setting the S1, S3, S4, S6, S8, and S9 bits, also in accordance with the corresponding values found in the current one of the 10 msec, 30-bit frames. For those of the S3, S4, S8, and S9 bits not found in the current one of the 10 msec, 20-bit frames, the corresponding bits of the V.110 frame are set to the values found in the preceding one of the 10 msec, 30-bit frames. The E1, E2, and E3 bits of the V.110 10 msec, 80-bit frame are set to the values stored in the memory of the second rate adaptation arrangement. The E4, E5, and E6 bits of the V.110 10 msec, 80-bit frame are set to the second binary state. The first binary state may correspond to a binary 0, and the second binary state to a binary 1.

In a particularly advantageous embodiment of the invention, the link includes an air link or path, which may be between a satellite and a ground terminal or user.

DESCRIPTION OF THE INVENTION

FIG. 4 illustrates a communication system 210 according to the invention. Some elements of the communication system are identical to those of FIG. 1, and those elements are designated by the same reference numerals. Other elements of the arrangement of FIG. 4 correspond to elements of FIG. 1, but are not identical; those elements are designated by like reference numerals in the 200 series. For example, the bandwidth-limited link is designated 15 in FIG. 1, while the corresponding element of FIG. 4 is designated 215.

In FIG. 4, the communication system 210 is illustrated as including a block 12, representing a source of digital information or data signals. The data bits are generated synchronously at a data rate of 2400 bps (2.4 kbps), and are associated, as known in the art, with control bits, which may be asynchronous. The 2.4 kbps data from block 12 are applied to a block 214, which represents a first rate adapter. First rate adapter 214 multiplexes the data bits, the control bits, and synchronizing bits, if any, which it receives from block 12, and possibly adds rudimentary error detection codes, to adapt the bit rate to 3 kbps, in the form of successive 10 msec frames, each of 30 bits.

Figure 5A:
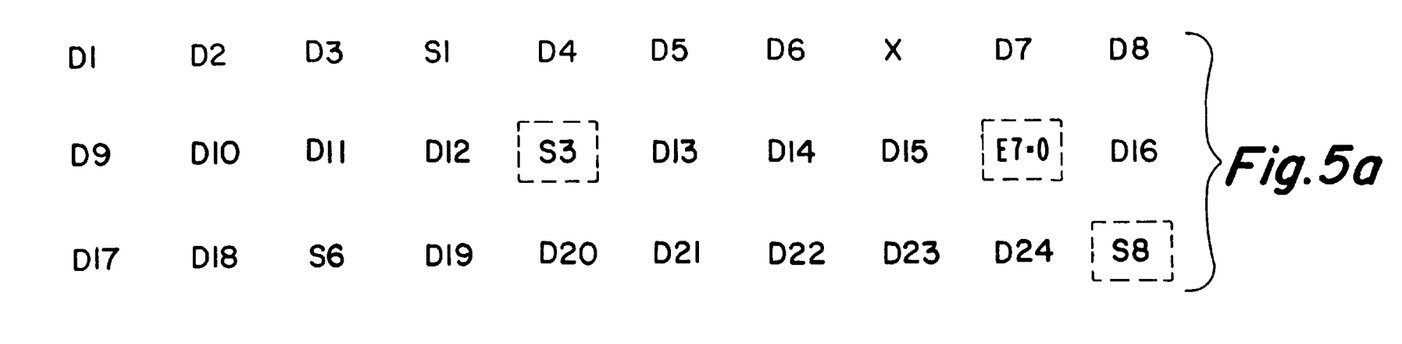
FIG. 5 is an illustration of the bit structure of a 10 msec., 30-bit frame used in the system of FIG. 4.
Figure 5B:
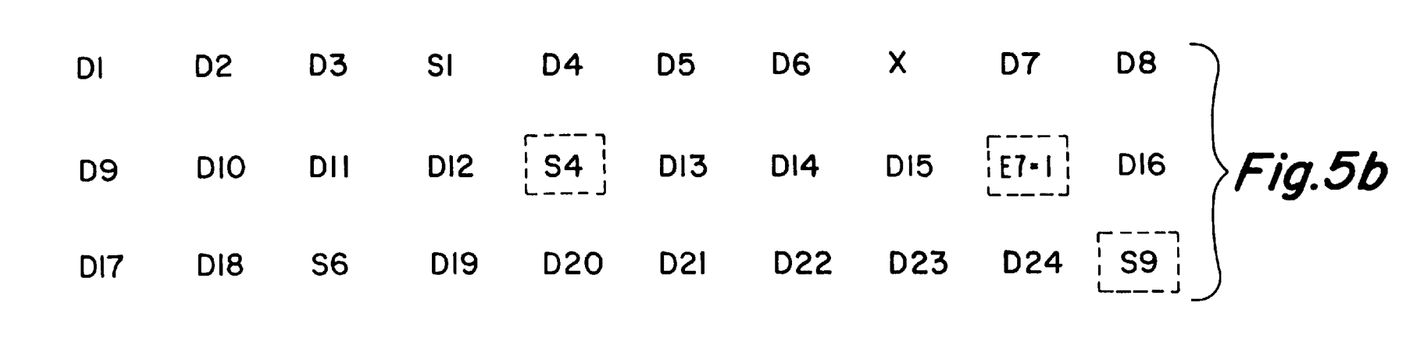

FIGS. 5a and 5b together illustrate the structure of two successive 10 msec., 30-bit frames as produced by first rate adapter 214. Thirty-bit frames recurring at a 10 msec. rate correspond to a 3 kbps data rate. Frames having the data structure of FIG. 5a alternate in a regular or cyclic manner with frames having the data structure of FIG. 5b, and may be viewed as being paired with each other. Time flow and data bit designations in FIG. 5a and 5b follow those of FIGS. 2 and 3, and thus the first bit in each frame is D1, and the second is D2. One difference between the frame illustrated in FIG. 2 and those of FIGS. 5a and 5b is that the frame of FIG. 2 contains two X bits, while the frames of FIGS. 5a and 5b contain only one; thus, one concomitant of reduction of the link data rate from 3.6 kbps as described in conjunction with FIG. 1 and the 3 kbps as described for FIG. 4 is that some redundancy is lost.

In FIG. 5a, certain bits are enclosed within dashed lines to draw attention thereto, and to emphasize the differences between frames of the frame pair represented by FIGS. 5a and 5b. More particularly, the 15th, 19th, and 30th data bits of the frames of FIGS. 5a and 5b are identified by dashed-line enclosures. In the frame of FIG. 5a, the 15th data bit is identified as carrying an S3 bit, while the 15th data bit of the frame of FIG. 5b carries S4. Also, in the frame of FIG. 5a, the 30th data bit is identified as carrying an S8 bit, while the 30th data bit of the frame of FIG. 5b carries S9. Thus, the S3 and S4 data bits occur in the 15th bit position on alternate 30-bit frames. Similarly, the S8 and S9 data bits occur in the 30th bit position on alternate 30-bit frames. It will also be noted that the 19th bit position of the frame of FIG. 5a indicates that data bit E7 takes on a binary 0 state, while the corresponding 19th bit of the frame of FIG. 5b has E7 at a binary 1 state. The E7 bit is therefore an identifier or flag which identifies the data bits in the 15th and 30th bit positions of the alternating frames of FIGS. 5a and 5b.

The 3 kbps data from first rate adapter block 214 of FIG. 4 is applied to an input port 215i of a transmission path or link 215. The data flows through the link 215, and becomes available at the output port 215o of link 215.

Link 215 of FIG. 4 includes a processor 216 which receives the 3 kbps data stream organized as described in conjunction with FIGS. 5a and 5b, and converts it by addition of EDAC to produce a 24 kbps full-rate channel, arranged as four 6 kbps quarter-rate channels, only one of which is used to carry the signal originating from DTE source 12. The information is applied from processor 216 to a ground station, which processes the signals, as required by the system, and as described in more detail in U.S. patent application Ser. No. 08/961,938, filed on Oct. 31, 1997 in the name of Van Hudson, and entitled "Spacecraft Cellular Communication System". The ground station 218 transmits the signals by way of an antenna 220, over an uplink, to a spacecraft 250, which acts a "bent-pipe" repeater, to retransmit the signals over a downlink toward the Earth, often with a frequency offset. The retransmitted signal is received by an antenna 222 at another ground station 224, which processes the signal to restore its 24 kbps full-channel, 6 kbps quarter-channel data rate. The 24 kbps full-channel, 6 kbps quarter-channel data rate signals are applied to a processor 226, which uses the EDAC signals to produce what is expected to be error-free data at 3 kbps, organized as illustrated in FIGS. 5a and 5b.

The output from processor block 226 is also the output port 215o of link 215. The 3 kbps is applied from link 215 to a demultiplexer 228, which receives the alternating frames of FIGS. 5a and 5b, and performs several functions, including storing of the 15th and 30th bit position data for one frame interval, so that the data available from the current one of the frames, which lacks either S3, S8 or S4, S9, can be combined with the stored values from the previous frame.

The 2.4 kbps data stream is applied from demultiplexer 228 of FIG. 4 over a signal path D to second rate adapter 230, while the control/synch bits are applied over a C path to rate adapter 230. Second rate adapter 230 converts the 2.4 kbps data and associated control bits into an 8 kbps data stream, organized into 10 msec, 80-bit frames pursuant to the V.110 International Telecommunications Union (ITU) as illustrated in FIG. 3. This is accomplished in second rate adapter block 230 by (a) duplicating each of data bits D1, . . . , D24, and inserting the paired bits into the appropriate locations in the V.110 frames, (b) inserting 17 synchronization bits, namely eight zeroes and nine ones, into the V.110 frames, (c) retrieving the stored values of E1, E2, and E3 from memory, and inserting the values into the frame, (d) inserting binary ones in place of E4, E5, and E6, and (e) duplicating the X bit, and inserting it into the proper locations in the V.110 frame of FIG. 3. The procedure performed by block 230, as described above, is simple enough so that no flow chart is needed in order to understand its operation.

The 80-bit, 10 msec V.110 frames as illustrated in FIG. 3, produced by second rate adapter 230 of FIG. 4, are applied to a third rate adapter 32, in known manner, to convert the 8 kbps data to 64 kbps, compatible with Integrated Service Data Network (ISDN) service.

Other embodiments of the invention will be apparent to those skilled in the art. For example, while the described system includes a satellite repeater as part of the air link, the same bandwidth efficiency advantage can be obtained in a terrestrial repeater system. Such terrestrial repeaters may be in cellular personal communications systems (PCS).

Thus, a digital communication system (210) according to an aspect of the invention, for communicating with an ISDN-compatible system (36, 38) having a bit rate of 64 kbps over a communication link (215) having a data rate of 3 kbps, includes a source (12) of synchronous information data at a data rate of 2.4 kbps, and associated control bits. The digital communication system (210) also includes a first rate adaptation arrangement (214) coupled to the source of information data (12) and to an input port (215i) of the link (15). The first rate adaptation arrangement (214) converts the data rate of 2.4 kbps to a data rate of 3 kbps. The 3 kbps data is organized into successive 10 msec frames, each of 30 bits. Each of the 10 msec, 30-bit frames includes a single X status bit, and an E7 bit which alternates binary states from one frame to the next. Each of the 10 msec, 30-bit frames also includes S3 and S8 status bits, but not S4 and S9 status bits, during those frames in which the E7 bit takes a first binary state.

Each of the 10 msec, 30-bit frames further includes S4 and S9 status bits, but not S3 and S8 status bits, during those frames in which the E7 bit takes a second binary state. Consequently, information relating to the S3 and S4 bits is multiplexed onto alternate ones of the 10 msec., 30-bit frames, and information relating to the S8 and S9 bits is multiplexed onto alternate other ones of the 10 msec., 30-bit frames. The first rate adaptation arrangement (214) transmits the 3 kbps data over the link (215). A second rate adaptation arrangement (228, 230) is coupled to an output port (215o) of the link (215), for converting the 3 kbps data received from the link to 8 kbps, organized as 10 msec, 80-bit V.110 frames. The communication system further includes a third rate adaptation arrangement (32) coupled to the second rate adaptation arrangement (30), for converting the 8 kbps data to 64 kbps, ISDN-compatible data. The first binary state of the E7 bit may be binary 0, and the second binary state in that case is binary 1.

In a particular embodiment of the invention, each the 10 msec, 30-bit frames further includes S1 and S6 bits, and 24 data bits denominated D1, D2, D3, D4, D5, D6, D7, D8, D9, D10, D11, D12, D13, D14, D15, D16, D17, D18, D19, D20, D21, D22, D23, and D24. The sequence in which the 30 bits occur in the 10 msec, 30-bit frame is D1, D2, D3, S1, D4, D5, D6, X, D7, D8, D9, D10, D11, D12, one of S3 and S4, D13, D14, D15, E7, D16, D17, D18, S6, D19, D20, D21, D22, D23, D24, and one of S8 and S9.

In a particular embodiment of the invention, each the 10 msec, 30-bit frame generated by the first rate adaptation arrangement (214) further includes S1 and S6 bits, and 24 data bits denominated D1, D2, D3, D4, D5, D6, D7, D8, D9, D10, D11, D12, D13, D14, D15, D16, D17, D18, D19, D20, D21, D22, D23, D24. In this particular embodiment, the second rate adaptation arrangement (30) includes a memory (18m) preloaded with information specifying the values of E1, E2, and E3 bits. The second rate adaptation arrangement (30), which is coupled to the output port (215o) of the link (215), maps information from at least each pair of the 10 msec 30-bit frames to a 10 msec., 80-bit frame, in accordance with the V.110 standard of the Consultative Committee for International Telephone and Telegraph (CCITT), now International Telecommunications Union (ITU). The V.110, 10 msec, 80-bit frame has the first eight bits set to a first binary state, and also has the 9th, 17th, 25th, 33d, 41st, 49th, 57th, 65th, 73d bits set to a second binary state. The other 73 bits of the 10 msec, 80-bit frame are available for carrying information. The mapping from the 30-bit frames to the 80-bit frames is accomplished by setting, in each of the 80-bit V.110 frames, the D1, D2, D3, D4, D5, D6, D7, D8, D9, D10, D11, D12, D13, D14, D15, D16, D17, D18, D19, D20, D21, D22, D23, D24 data bits, and the X and E7 bits, in accordance with the corresponding value in the current one of the 10 msec, 30-bit frames, and by setting the S1, S3, S4, S6, S8, and S9 bits, also in accordance with the corresponding values found in the current one of the 10 msec, 30-bit frames. For those of the S3, S4, S8, and S9 bits not found in the current one of the 10 msec, 30-bit frames, the corresponding bits of the V.110 10 msec, 80-bit frame are set to the values found in the preceding one of the 10 msec, 30-bit frames. The E1, E2, and E3 bits of the V.110 10 msec, 80-bit frame are set to the values stored in the memory (30m) of the second rate adaptation arrangement (30). The E4, E5, and E6 bits of the V.110 10 msec, 80-bit frame are set to the second binary state. The first binary state may correspond to a binary 0, and the second binary state to a binary 1.

In a particularly advantageous embodiment of the invention, the link (215) includes an air link or path (249), which may be between a satellite (250) and one or more ground terminals or users (218, 224).

What is claimed is:

1. A digital communication system for communication, said digital communication system comprising:

a source of synchronous information data at a data rate of 2.4 kbps, and associated control bits:

a first rate adaptation arrangement coupled to said source of information data and to an input port of said link, for converting said data at a data rate of 2.4 kbps to 3 kbps data at a data rate of 3 kbps, said 3 kbps data being organized in successive 10 msec frames, each of 30 bits each said 10 msec, 30-bit frame having 24 data bits, and including a single X status bit, an E7 bit which alternates binary states from one frame to the next, and S3 and S8 status bits, but not S4 and S9 status bits, during those frames in which said E7 bit takes a first binary state, and each said 10 msec, 30-bit frame including S4 and S9 status bits, but not S3 and S8 status bits, during those frames in which said E7 bit takes a second binary state, whereby information relating to said S3 and S4 bits is multiplexed onto alternate ones of said 10 msec, 30-bit frames, and information relating to said S8 and S9 bits is multiplexed onto alternate other ones of said 10 msec frames, said first rate adaptation arrangement being for transmitting said 3 kbps data over said link;

a second rate adaptation arrangement coupled to an output port of said link, for converting said 3 kbps data to 8 kbps data; and a third rate adaptation arrangement coupled to said second rate adaptation arrangement, for converting said 8 kbps data to 64 kbps data, whereby said 64 kbps data can be coupled to an ISDN-compatible system.

2. The system according to claim 1, wherein each said 10 msec, 30-bit frames further includes S1 and S6 bits, and 24 data bits denominated D1, D2, D3, D4, D5, D6, D7, D8, D9, D10, D11, D12, D13, D14, D15, D16, D17, D18, D19, D20, D21, D22, D23, D24, and the sequence in which said 30 bits occur in said 10 msec, 30-bit frame is D1, D2, D3, S1, D4, D5, D6, X, D7, D8, D9, D10, D11, D12, one of S3 and S4, D13, D14, D15, E7, D16, D17, D18, S6, D19, D20, D21, D22, D23, D24, and one of S8 and S9.

3. The system according to claim 1, wherein said first binary state of said E7 bit is binary 0, and said second binary state is binary 1.

4. The system according to claim 1, wherein said link includes an air link.

5. A digital communication system, said digital communication system comprising:

a source of synchronous information data at a data rate of 2.4 kbps, and associated control bits:

a first rate adaptation arrangement coupled to said source of information data and to an input port of said link, for converting said data at a data rate of 2.4 kbps to 3 kbps data at a data rate of 3 kbps, said 3 kbps data being organized in successive 10 msec frames, each of 30 bits, each said 10 msec, 30-bit frame including a single X status bit, an E7 bit which alternates binary states from one frame to the next, and S3 and S8 status bits, but not S4 and S9 status bits, during those frames in which said E7 bit takes a first binary state, and each said 10 msec, 30-bit frame including S4 and S9 status bits, but not S3 and S8 status bits, during those frames in which said E7 bit takes a second binary state, whereby information relating to said S3 and S4 bits is multiplexed onto alternate ones of said 10 msec, 30-bit frames, and information relating to said S8 and S9 bits is multiplexed onto alternate other ones of said 10 msec frames, said first rate adaptation arrangement being for transmitting said 3 kbps data over said link;

a second rate adaptation arrangement coupled to an output port of said link, for converting said 3 kbps data to 8 kbps data; and a third rate adaptation arrangement coupled to said second rate adaptation arrangement, for converting said 8 kbps data to 64 kbps data, whereby said 64 kbps data can be coupled to an ISDN-compatible system, and wherein:

each said 10 msec, 30-bit frame generated by said first rate adaptation arrangement further includes S1 and S6 bits, and 24 data bits denominated D1, D2, D3, D4, D5, D6, D7, D8, D9, D10, D11, D12, D13, D14, D15, D16, D17, D18, D19, D20, D21, D22, D23, D24;

said second rate adaptation arrangement includes a memory preloaded with information specifying the values of E1, E2, and E3 bits; and said second rate adaptation arrangement coupled to said output port of said link performs a mapping of at least each pair of said 10 msec 30-bit frames to a 10 msec 80-bit frame, in accordance with the V.110 standard of the Consultative Committee for International Telephone and Telegraph (CCITT), now International Telecommunications Union (ITU), which 10 msec, 80-bit frame has its first eight bits set to a first binary state, and which also has its 9th, 17th, 25th, 33d, 41st, 49th, 57th, 65th, and 73d bits set to a second binary state different from said first binary state, and has bit locations other than said first eight bits and said 9th, 17th, 25th, 33d, 41st, 49th, 57th, 65th, and 73d bits available for carrying information, said mapping being accomplished by setting, in each said 10 msec, 80-bit frame, said D1, D2, D3, D4, D5, D6, D7, D8, D9, D10, D11, D12, D13, D14, D15, D16, D17, D18, D19, D20, D21, D22, D23, D24 data bits, and said X and E7 bits, from the corresponding data bit value in the current one of said 10 msec, 30-bit frames, and by setting the S1, S3, S4, S6, S8, and S9 bits, also in accordance with the corresponding data bit values found in said current one of said 10 msec, 30-bit frames, and for those of said S3, S4, S8, and S9 bits not found in said current one of said 10 msec, 20-bit frames, setting the value of said S3, S4, S8, and S9 bits of said 10 msec, 80-bit frame to the values of said S3, S4, S8, and S9 bits found in the preceding one of said 10 msec, 30-bit frames, and by setting E1, E2, and E3 to the values stored in said memory, and by setting E4, E5, and E6 to said second binary state.

6. The system according to claim 5, wherein said first binary state is binary 0, and said second binary state is binary 1.

7. A method for transmitting digital information from a source of 2.4 kbps data, accompanied by control bits, through a data link having a data rate of 3 kbps, for communicating with an ISDN-compatible data sink, said method comprising the steps of:

at the beginning of each message, storing information relating to the source data rate in the form of values for E1, E2, and E3 bits;

converting said 2.4 kbps data accompanied by control bits into successive 30-bit, 10 msec frames, each of said 10 msec, 30-bit frames having 24 data bits, and including a single X status bit, an E7 bit which alternates binary states from one frame to the next, S3 and S8 status bits, but not S4 and S9 status bits, during those frames in which said E7 bit takes a first binary state, and S4 and S9 status bits, but not S3 and S8 status bits, during those frames in which said E7 bit takes a second binary state, whereby information relating to said S3 and S4 bits is multiplexed onto alternate ones of said 10 msec, 30-bit frames, and information relating to said S8 and S9 bits is, multiplexed onto alternate other ones of said 10 msec frames;

transmitting said 10 msec, 30-bit frames over said data link;

at the output of said data link, converting said 10 msec, 30-bit frames to 10 msec, 8 kbps, 80-bit V.110 frames, by retrieving said values for E1, E2, and E3 from memory for use in said V.110 frames, by replicating each data value and the value of the X bit, and by setting the values of E4, E5, and E6 to a selected binary state; and adapting the rate of said 8 kbps, 80-bit, V.110 frames to 64 kbps by adding dummy bits.

* * * * *